Oct. 6, 1970 H. SCHLUTER ET AL 3,532,824
CONTROL CIRCUIT FOR MULTISTAGE CROSSPOINT NETWORKS
Filed Nov. 1, 1966
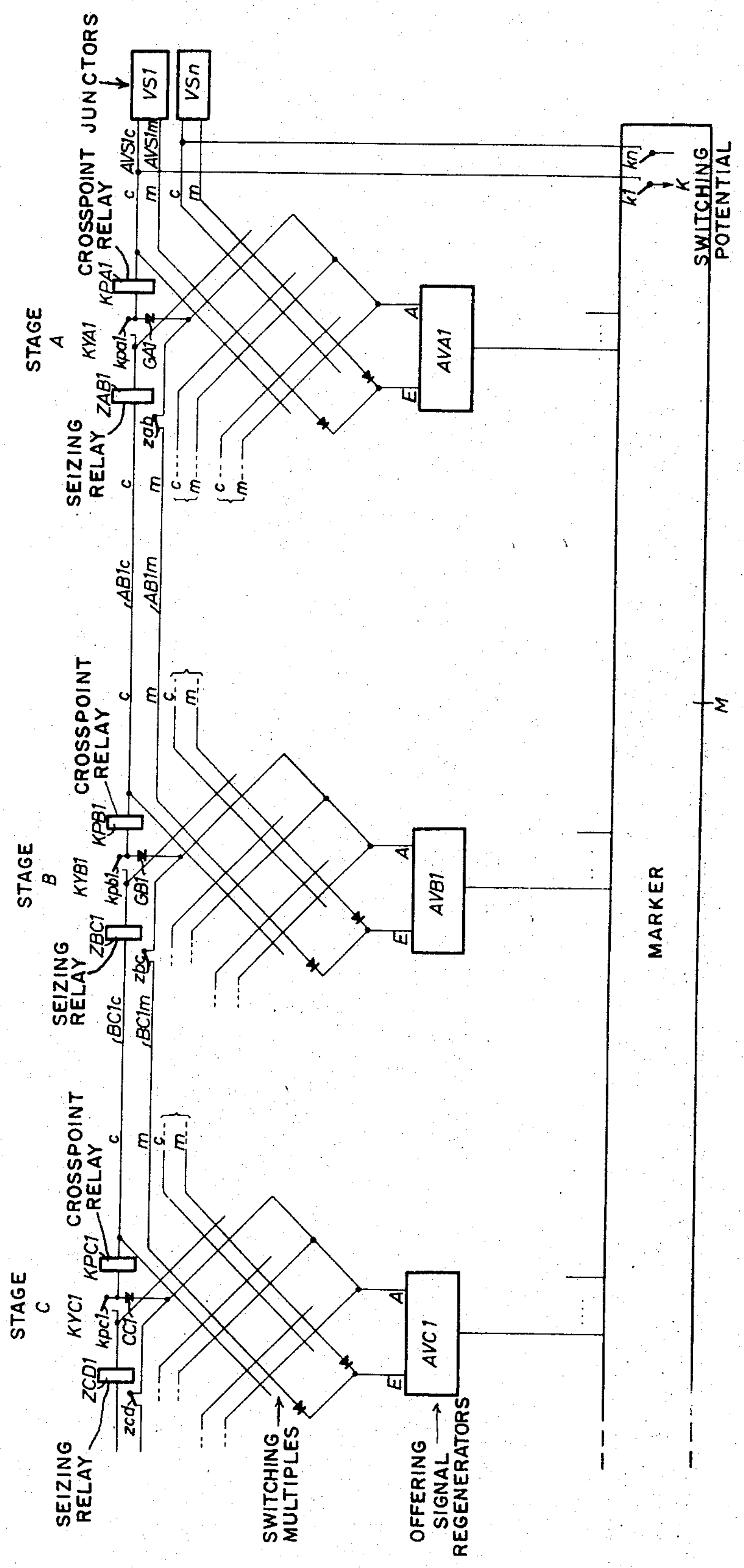

3,532,824

CONTROL CIRCUIT FOR MULTISTAGE CROSSPOINT NETWORKS

Heinz Schluter, Kornwestheim, and Hilmar Schonemeyer, Ditzingen, Germany, assignors to International Standard Electric Corporation Filed Nov. 1, 1966, Ser. No. 591,299
Claims priority, application Germany, Nov. 17, 1965, St 24,657
Int. Cl. H04q 3/495
U.S. Cl. 179—18 4 Claims

ABSTRACT OF THE DISCLOSURE

A guide-wire network for use in selecting a desired path through multistage crosspoint networks. The guide-wire network is also used for marking columns in the crosspoint network.

The invention relates to a control circuit for a multistage crosspoint network of the guide-wire type.

As those skilled in the art know, a guide-wire network simulates the links in an actual switching network. Control facilities select a path through the switching network responsive to potentials applied to the guide-wires. Crosspoints then operate in each switching stage to complete the route corresponding to the route selected by the guide-wires responsive to a calling line request for establishing the connection.

A regular multistage crosspoint network is understood as an arrangement in which only one link exists between two switching multiples of adjacent switching stages. A connection is selected in such a crosspoint arrangement by always selecting one switching multiple in each switching stage. This does not determine the particular crosspoint elements or crosspoint relays which are to be actuated in the individual switching multiples. Each link is connected between a column in one stage and a row in the next stage. For through-switching in each switching stage, a crosspoint relay must be energized in a selected switching multiple that can connect the link extending from the selected switching multiple of the preceding switching stage to the link leading to the selected multiple of the next switching stage.

In known crosspoint arrangements, a column of the individual switching multiples is marked by applying a suitable potential from a central control facility. A row of the switching multiple is marked through the holding contact of the energized crosspoint relay of the preceding switching stage. Through-switching in the individual switching stages is, carried out in a timely sequence, by operating the crosspoint where the marked row and column intersect.

In a crosspoint arrangement, of the type described above, a column is selected to be marked in a switching multiple at the moment when a switching multiple is selected in the next succeeding switching stage. If these stages are far distant from each other or if the switching stages are actuated by different markers, known systems have required an additional expenditure of time to transmit the multiple selection information backward through the network. Moreover, when it becomes necessary to make changes (regroupings) in the switching network, suitable changes must also be made in the centralized control elements.

An object of the invention is to avoid these disadvantages.

In accordance with one aspect of the invention, the control circuit arrangement is constructed so that a column of a selected switching multiple is marked via the guide-wire associated with the link leading from the selecting multiple to the selected multiple of the next succeeding switching stage. A row of a selected switching multiple is marked via a holding contact of a crosspoint relay. This contact is inserted into the seize-wire of the link concerned. The crosspoint relay is energized in a switching multiple of the preceding switching stage. The guide-wire network existing primarily for the route search is used for the backward transmission of information concerning marking of the columns. Thus, it is not necessary to provide additional switching means to transmit this information. Besides, no additional difficulties occur when regroupings are made within the switching network. The guide-wire network is always adapted to the link arrangement to enable the route search.

The above mentioned and other features of this invention and the manner of obtaining them will become more apparent, and the invention itself will be best understood by reference to the following description of an embodiment of the invention taken in conjunction with the accompanying single sheet of drawing which shows an exemplary guide-wire network incorporating the invention.

This drawing shows switching stages A, B and C of a multi-stage regular crosspoint arrangement. Each arrangement is represented by a switching multiple, such as KYA1, KYB1 and KYC1 and by an offering signal regenerator AVA1, AVB1, AVC1. Each switching stage may comprise a plurality of such switching multiples. Only the guide wires *m* and the seize-wires *c* are shown on the links and terminal lines. An exemplary one of many crosspoint elements is shown for each of the switching multiples.

A switching multiple is selected in each switching stage with the aid of guide-wires *m* of the links and of the offering signal regenerators. According to a route search method, this selection begins with an offering signal and an access signal from the marker M. Responsive to these signals, the guide-wire network finds a connection from a junctor (e.g. VS1) to an output at the left-hand side of the crosspoint arrangement.

It is assumed that, in the above described or any other suitable manner, the switching multiples KYA1, KYB1 and KYC1 have been selected for establishing a connection starting at the junctor VS1. If there are other switching stages (not shown on the drawing), a switching multiple is selected in each stage to provide arrangements similar to those shown here.

To initiate the through-switching process, the marker M operates contacts K1 to apply a switching potential K to the seizing wire AVS1*c* of the outlet to the junctor VS1. A switching reference potential is applied to the terminal E of the offering signal regenerator AVB1. This potential may be either furnished by the marker M or generated in the offering signal regenerator itself. Consequently, the crosspoint relay KPA1 operates over the following responding circuit: the potential applied to terminal E of the offering signal regenerator AVB1, guide-wire AB1*m*, break-contact ZAB of the seizing relay ZAB1, decoupling rectifier GA1, winding of the crosspoint relay KPA1, seize-wire AVS1*c* of the terminal line of junctor VS1, contact *k*1 in the marker M, switching potential K. The crosspoint relay KPA1 operates and through-connects from wire AVS1*c*, the relay's winding, and its make-contact KPA1, to the seizing wire AB1*c* of the link leading to the selected switching multiple KYB1 of the succeeding switching stage B. Thus, the row of the switching multiple KYB1, including the crosspoint relay KPB1, is marked via contact KPA1. A switching of the reference potential, applied to the terminal E of the offering signal regenerator AVC1 marks the corresponding column of the switching multiple KYB1 via the guide-wire BC1*m*.

The crosspoint relay KPB1 and the seize relay ZAB1 are energized in series, while the crosspoint relay KPA1 is held operated. There is no immediate effect, therefore, if the switching reference potential is removed from terminal E of the offering signal regenerator AVB1. The guide-wire AB1*m* is marked as busy to the following route searching processes since the contacts *zab* are now open.

Since the crosspoint relay KPA1 must be actuated before the relay ZAB1 can respond, the guide-wire AB1*m* has completed its function. That is, the column is marked, and the guide-wire can be disconnected. The holding potentials of the seize-wires are thus kept off the terminals E of the offering signal regenerators, to avoid interference during the succeeding route searching process.

Through-switching is made in the same way—successively at each selected switching multiples of the other switching stages. After the entire connection has been switched through, a holding potential is applied on the input and output end of the series-connected seize-wires. This potential holds the energized crosspoint relays and seizing relays in an operated position. All of the switching reference potentials applied to the terminal E of the offering signal regenerator may be the same (e.g. ground potential).

The holding potentials and the potentials applied to the guide-wires for the route search are selected so that the decoupling rectifiers are back biased when energized by the holding potential of the seize-wire and guide potential of a guide-wire.

The switching reference potential applied to a stage must be removed after through-switching in the preceding switching stage. Only then can the through-switching to the next switching stage take place. On the other hand, different, mutually staggered switching reference potentials may be used in the various switching stages so that the potentials can stay applied during the entire through-switching process.

While the principles of the invention have been described above in connection with specific apparatus and applications, it is to be understood that this description is made only by way of example and not as a limitation on the scope of the invention.

We claim:

1. A control circuit arrangement for a multistage crosspoint network comprising means including a guide wire network for simulating the links in the crosspoint network, each simulation of a link comprising a guide wire and a seize wire, control means for selecting a switching multiple in each switching stage to find an idle switch path corresponding to a requested connection, means for marking a column of a selected switching multiple via the guide-wire simulating the link leading from said selected switching multiple to the selected switching multiple of the next succeeding switching stage, and means for marking a row of a selected switching multiple via a crosspoint holding contact, said crosspoint holding contact being associated with the crosspoint switching element switched at the selected switching multiple in the preceding stage, said crosspoint switching element being in series with the seize-wire of the link leading from a selected switching multiple of said preceding stage to said selected switching multiple.

2. The control circuit arrangement according to claim 1, wherein each of said crosspoints has an operating winding, means for connecting the windings of the crosspoints of a column of a switching multiple with the guidewire simulating the link leading from said selected switching multiple to the selected switching multiple of the next succeeding stage via a decoupling rectifier provided for each crosspoint.

3. The circuit arrangement according to claim 2, and means for applying holding potentials to the seize wires through-connected via the holding contacts and the windings of the energized crosspoints, and means for applying the demand potentials to the guide-wires for the route search, said holding and demand potentials having a ratio such that they back bias the decoupling rectifiers for each crosspoint in an established connection.

4. The circuit arrangement according to claim 1, and means comprising a seizing relay in a working circuit for a crosspoint of a switching stage for responding in series with the crosspoint, said seizing relay being inserted into the seize-wire of the link leading to the preceding switching stage, and means for disconnecting said seizing relay through its break-contact, said break contact being in series with the guide-wire associated with said link.

No references cited.

WILLIAM C. COOPER, Primary Examiner